Feb. 26, 1929.
A. KIRNER
1,703,491
CONTROL APPARATUS FOR VEHICLES, MACHINES, AND THE LIKE
Filed Nov. 17, 1927
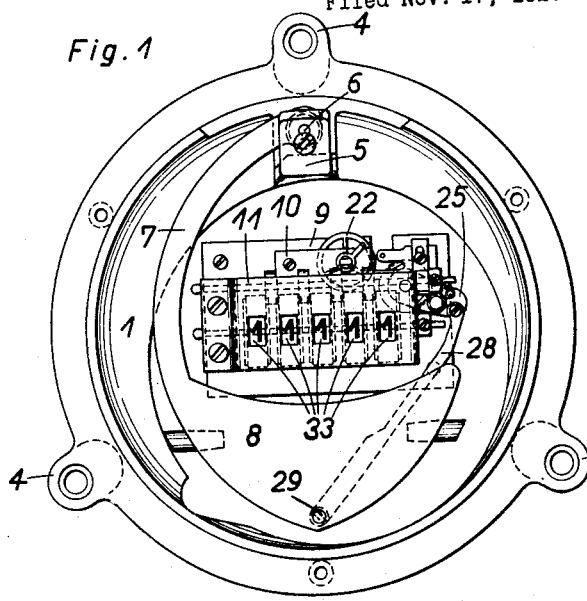
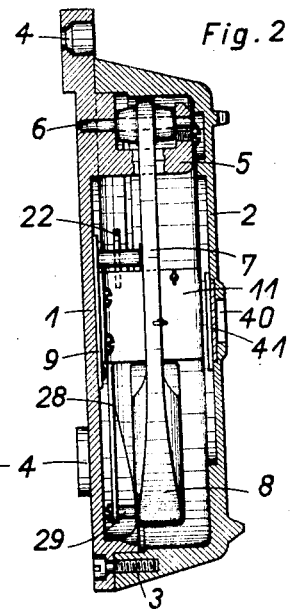
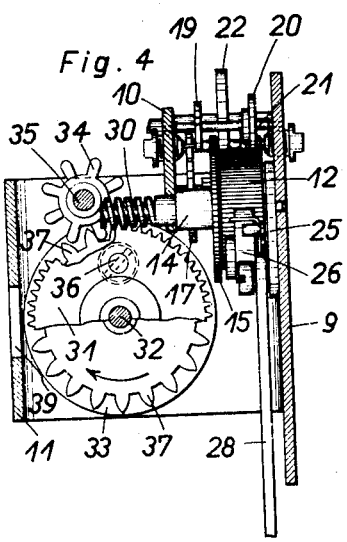
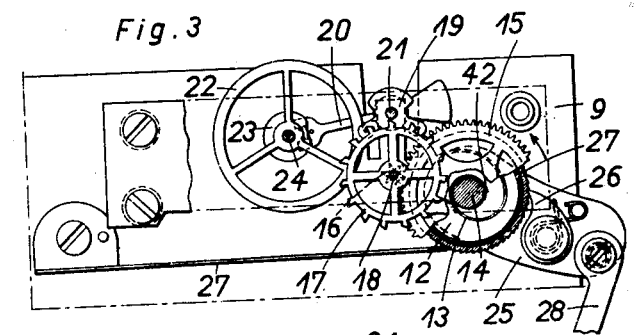
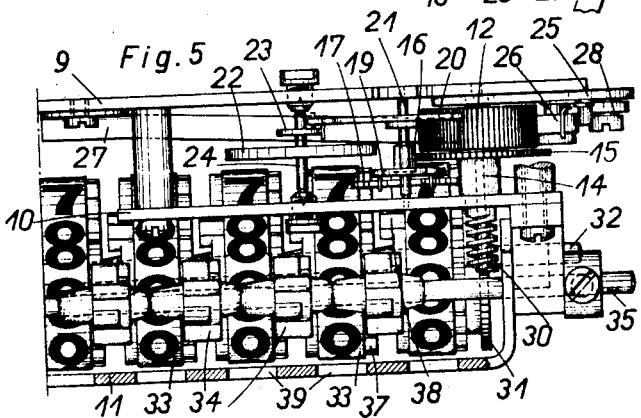
INVENTOR Patented Feb. 26, 1929.

1,703,491

UNITED STATES PATENT OFFICE.

ANTON KIRNER, OF NEUSTADT, BADEN, GERMANY.

CONTROL APPARATUS FOR VEHICLES, MACHINES, AND THE LIKE.

Application filed November 17, 1927, Serial No. 233,938, and in Germany March 11, 1927.

My invention relates to an apparatus adapted to be attached to an automobile or other vehicle, a machine or other moving body for the purpose of automatically controlling the use thereof. The object of the invention is to provide an apparatus of simple and compact construction and of reliable operation which requires no removable dial needing to be replaced by another in certain periods and no winding up by hand or any other attention.

The apparatus comprises a pendulum or other oscillating body deriving movement from the vehicle or machine to which the apparatus is attached, furthermore a spring-driven clock-work automatically wound up by said oscillating body, and a counter-work driven by said clock-work and continuously adding up and indicating the sum of the periods of use of the vehicle or machine, said clock-work being wound up always to such an extent only that it will stop shortly after the vehicle or machine has been stopped.

The invention is illustrated in the accompanying drawings, in which Fig. 1 is a front view with the cover of the casing removed, Fig. 2 is a side view with the casing in section, and Figs. 3, 4 and 5 are front, side and top views respectively showing parts of the mechanism on an enlarged scale.

The mechanism is contained within a closed casing consisting of a flat bottom 1, which carries the whole mechanism, and of a dish-shaped cover 2, which is secured to the bottom 1 by means of screws 3. The bottom is provided with three eyes 4 for attaching the apparatus to a vehicle or machine by means of screws which are driven through said eyes and locked in any suitable manner. Furthermore, the bottom 1 has at the top of its inner face a bearing lug 5, in which is mounted a bolt 6. The latter forms the fulcrum of a pendulum comprising a suspending arm 7 and a weight 8. In the space between the latter and the lug 5 there is secured to the bottom 1 a frame consisting of three plates 9, 10 and 11.

Located between and carried by the plates 9 and 10 is a clock-work. This work comprises the following parts: A barrel or spring-box 12 which contains a spiral spring 13 and is rotatably mounted on a barrel-arbor 14 journaled in said plates. A toothed wheel 15 which is fixedly mounted on the arbor 14. A pinion 16 meshing with the wheel 15 and connected with an escapement wheel 17, which is fixedly mounted on a shaft 18. An anchor 19 engaging with the wheel 17 and an anchor-fork 20, which both are fixedly mounted on a second shaft 21. A balance-wheel 22 and a pin-disc 23 engaging with the fork 20, which wheel and disc are fixedly mounted on a third shaft 24. And finally a spiral spring not shown which is attached at the inner end to a collar fixedly mounted on the shaft 24 and at the outer end to the plate 10.

The clock-work is provided with an automatic winding mechanism. This mechanism comprises a ratchet-lever 25 which is also rotatably mounted on the barrel-arbor 14 and carries a spring-controlled pawl 26 engaging with a ratchet toothing provided on the rim of the barrel 12, furthermore a flat spring 27 secured at one end to the plate 9 and also engaging with said toothing. The lever 25 is connected with the pendulum-weight 8 by a link 28 which is pivotally attached at one end to said lever and at the other to a pin 29 secured to said weight.

Located between the plate 9 and the bent plate 11 and carried by the latter is a counter-work. This work comprises the following parts: A worm 30 formed by the front part of the barrel-arbor 14. A toothed wheel 31 meshing with this worm and rotatably mounted on a shaft 32 which is disposed parallel to the plates 9, 10 and 11 and supported in the end pieces of the plate 11. Furthermore several, e. g. five, rollers 33 also rotatably mounted on the shaft 32 and carrying on its periphery the numerals 0 to 9. And finally several, e. g. four, pinions 34 rotatably mounted on a further shaft 35 which is disposed above and parallel to the shaft 32 and also supported in the end pieces of the plate 11.

The wheel 31 is coupled with the adjacent roller 33 by means of a screw 36. The pinions 34, each of which is mounted in a position between two adjacent rollers 33, mesh with a toothing 37 provided on the right hand face of one roller and are adapted to engage with a notched boss 38 provided on the left hand face of the other roller. The plate 11 is provided with several, e. g. five, openings 39 in positions corresponding with those of the rollers 33, and the cover 2 has an opening 40 extending in front of the openings 39 and closed by a pane of glass 41, which is secured to the inner face of the cover.

The apparatus being attached to the vehicle or machine whose use it is to control and the latter being set in motion, every oscillation of the pendulum 7, 8 derived from the movement of the vehicle or machine will be transmitted by the link 28 to the lever 25, which in its upward movement will by means of the pawl 26 cause the barrel 12 to rotate in the direction of the arrow in Fig. 3, whilst in its downward movement the spring 27 will prevent the barrel from rotation in opposite direction. The inner end of the spring 13 is attached to a hook 42 provided on the arbor 14, whilst the outer end of the same is not secured to but bears with friction on the rim of the barrel 12. Thus the latter will in its rotation carry with it the outer end of the spring 13 until the tension of this spring will reach a certain degree, whereupon the outer end of the spring will in the further rotation of the barrel slide on the rim of the same. In this manner the clockwork will be automatically wound up but always to a certain extent only. By proper adjustment of the spring this extent may be determined so that the clock-work will stop a few seconds after the vehicle or machine has been stopped and consequently the oscillation of the pendulum has ceased. The running of the clock-work is in known manner caused by the spring 13, which drives the arbor 14 together with the wheel 15 in the direction of the arrow, and is regulated by the escapement consisting of the parts 16, 17, 18, 19, 20, 21, 22, 23 and 24.

The rotation of the arbor 14 is by means of the worm 30 transmitted to the wheel 31 and the first roller 33 coupled therewith. This roller drives by means of the gear 38, 34, 37 the second roller, the latter in the same manner the third and so forth. The ratios of gearing are such that the first roller makes one revolution in each minute, the second roller one revolution in ten minutes, the third one revolution in hundred minutes and so forth. Thus the counter-work will continuously add up the periods of use of the vehicle or machine and indicate the sum thereof up to 9999.9 minutes and after reaching this sum will count anew. The sum will always be visible through the openings 39 and 40.

What I claim as my invention and desire to secure by Letters Patent is:

1. In an automatic control-apparatus for vehicles, machines and the like, the combination of an oscillating body deriving movement from the vehicle or machine to which the apparatus is attached, a clock-work comprising a barrel-arbor, a barrel rotatably mounted on said barrel-arbor, and a spiral spring contained within said barrel, the inner end of said spring being attached to said barrel-arbor and the outer end bearing with friction on the rim of said barrel, means transforming the oscillations of said oscillating body into intermittent rotation of said barrel in the direction of winding up said spiral spring, and a counter-work driven by said barrel-arbor and continuously adding up and indicating the sum of the periods of use of the vehicle or machine, said clock-work being automatically wound up by said oscillating body always to such an extent only that it will stop shortly after the vehicle or machine has been stopped.

2. In an automatic control-apparatus for vehicles, machines and the like, the combination of a closed casing containing the mechanism and comprising a bottom supporting the mechanism, a pendulum fulcrumed at said bottom and deriving movement from the vehicle or machine to which said casing is attached, a clock-work comprising a barrel-arbor, a barrel rotatably mounted on said barrel-arbor, and a spiral spring contained within said barrel, the inner end of said spring being attached to said barrel-arbor and the outer end bearing with friction on the rim of said barrel, means transforming the oscillations of said pendulum into intermittent rotation of said barrel in the direction of winding up said spiral spring, and a counter-work driven by said barrel-arbor and continuously adding up and indicating the sum of the periods of use of the vehicle or machine, said clock-work being automatically wound up by said pendulum always to such an extent only that it will stop shortly after the vehicle or machine has been stopped.

3. In an automatic control-apparatus for vehicles, machines and the like, the combination of an oscillating body deriving movement from the vehicle or machine to which the apparatus is attached, a clock-work comprising a barrel-arbor, a barrel rotatably mounted on said barrel-arbor and provided on its rim with a ratchet-toothing, and a spiral spring contained within said barrel, one end of said spring being secured to said barrel-arbor and the other end bearing with friction on the rim of said barrel, a ratchet-lever rotatably mounted on said barrel-arbor, a spring-controlled pawl carried by said ratchet-lever and engaging with said ratchet-toothing, a link connecting said ratchet-lever with said oscillating body, and a counter-work driven by said barrel-arbor and continuously adding up and indicating the sum of the periods of use of the vehicle or machine, said clock-work being automatically wound up by said oscillating body always to such an extent only that it will stop shortly after the vehicle or machine has been stopped.

4. In an automatic control-apparatus for vehicles, machines and the like, the combination of a closed casing containing the mechanism and comprising a bottom supporting the mechanism, a pendulum fulcrumed at said bottom and deriving movement from the vehicle or machine to which said casing is attached, a clock-work comprising a barrel-arbor, a barrel rotatably mounted on said barrel-arbor and provided on its rim with a ratchet-toothing, and a spiral-spring contained within said barrel, one end of said spring being secured to said barrel-arbor and the other end bearing with friction on the rim of said barrel, a ratchet-lever rotatably mounted on said barrel-arbor, a spring-controlled pawl carried by said ratchet-lever and engaging with said ratchet-toothing, a link connecting said ratchet-lever with said pendulum, and a counter-work driven by said barrel-arbor and continuously adding up and indicating the sum of the periods of use of the vehicle or machine, said clock-work being automatically wound up by said pendulum by means of said ratchet-lever and said barrel always to such an extent only that it will stop shortly after the vehicle or machine has been stopped.

In testimony whereof I affix my signature.

ANTON KIRNER.